Dec. 8, 1964 L. HUNTER 3,159,916
VEHICLE WHEEL ALIGNMENT APPARATUS
Filed Jan. 8, 1959 4 Sheets-Sheet 4

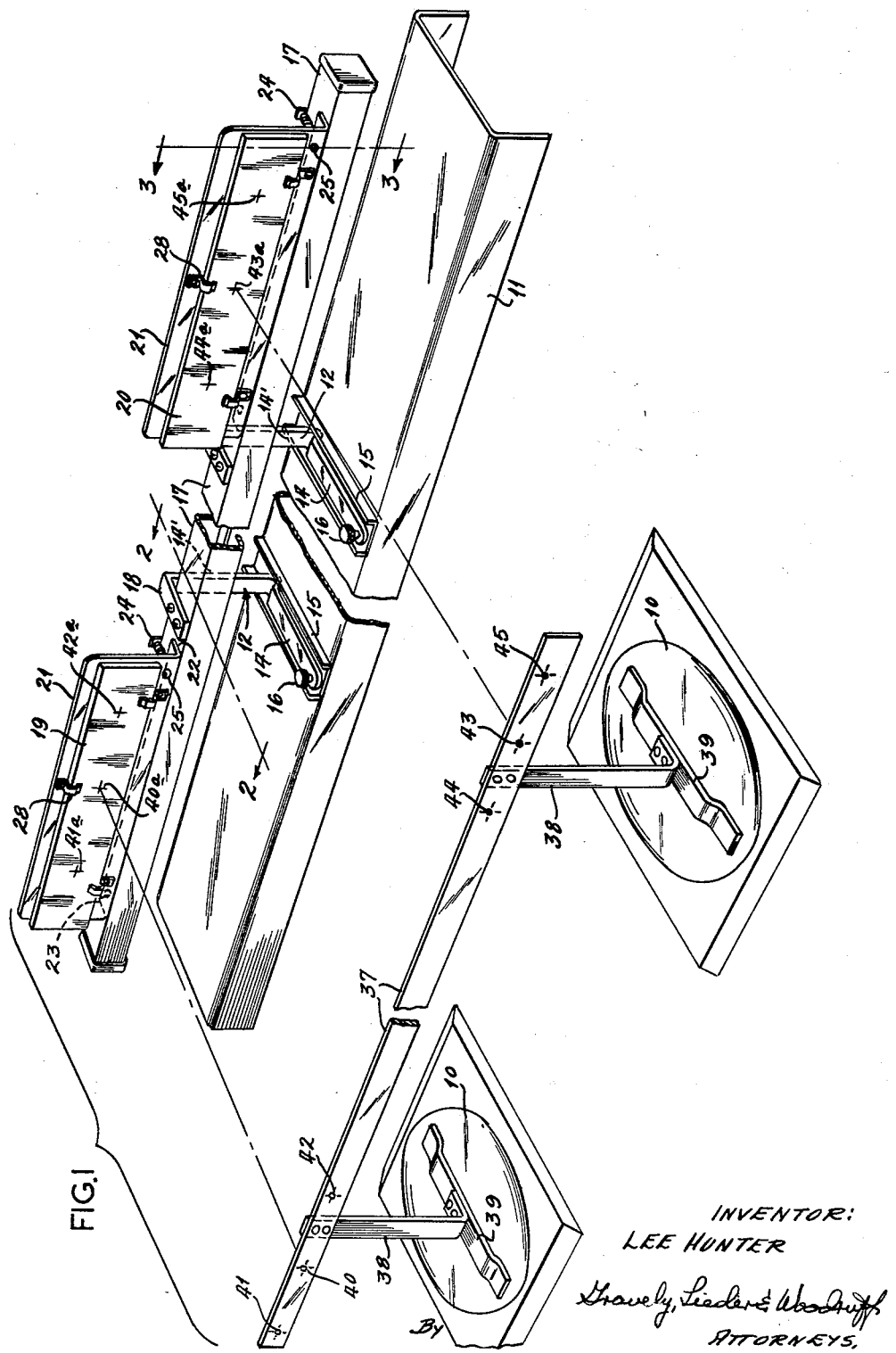

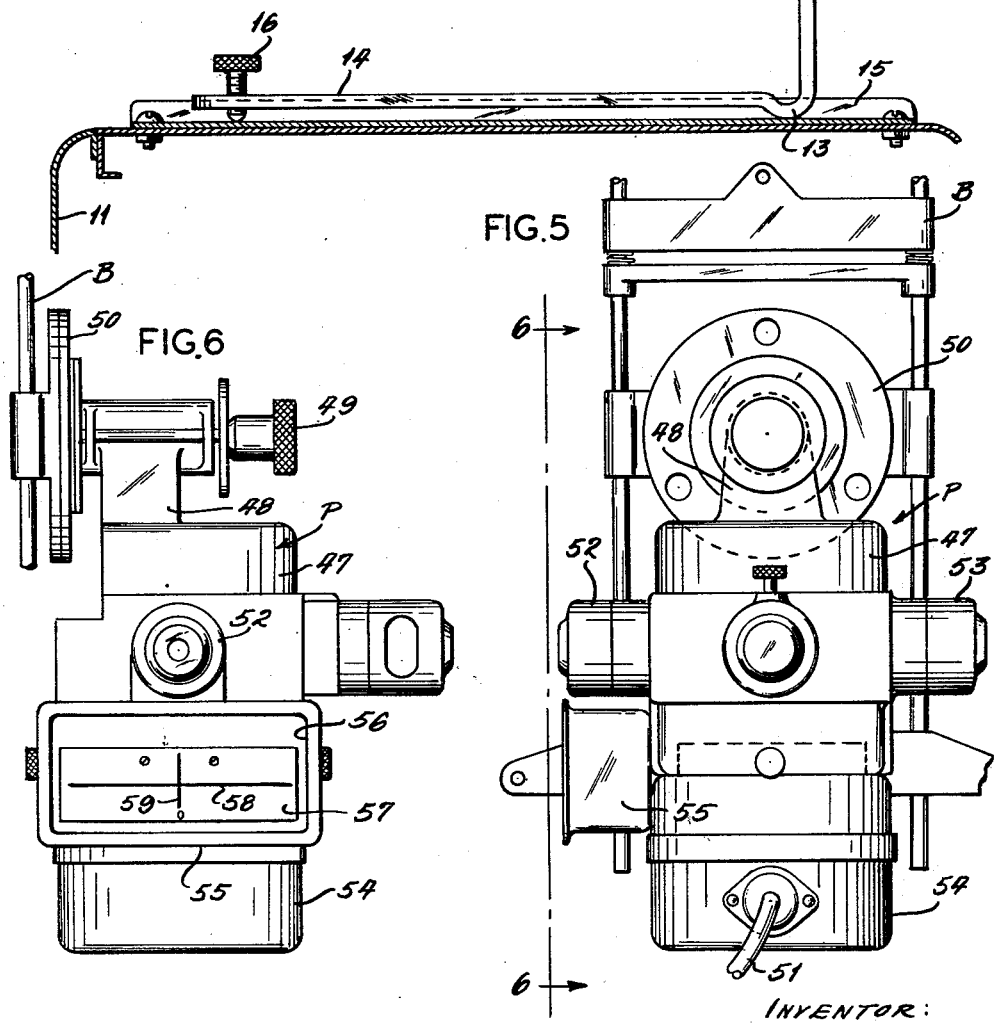

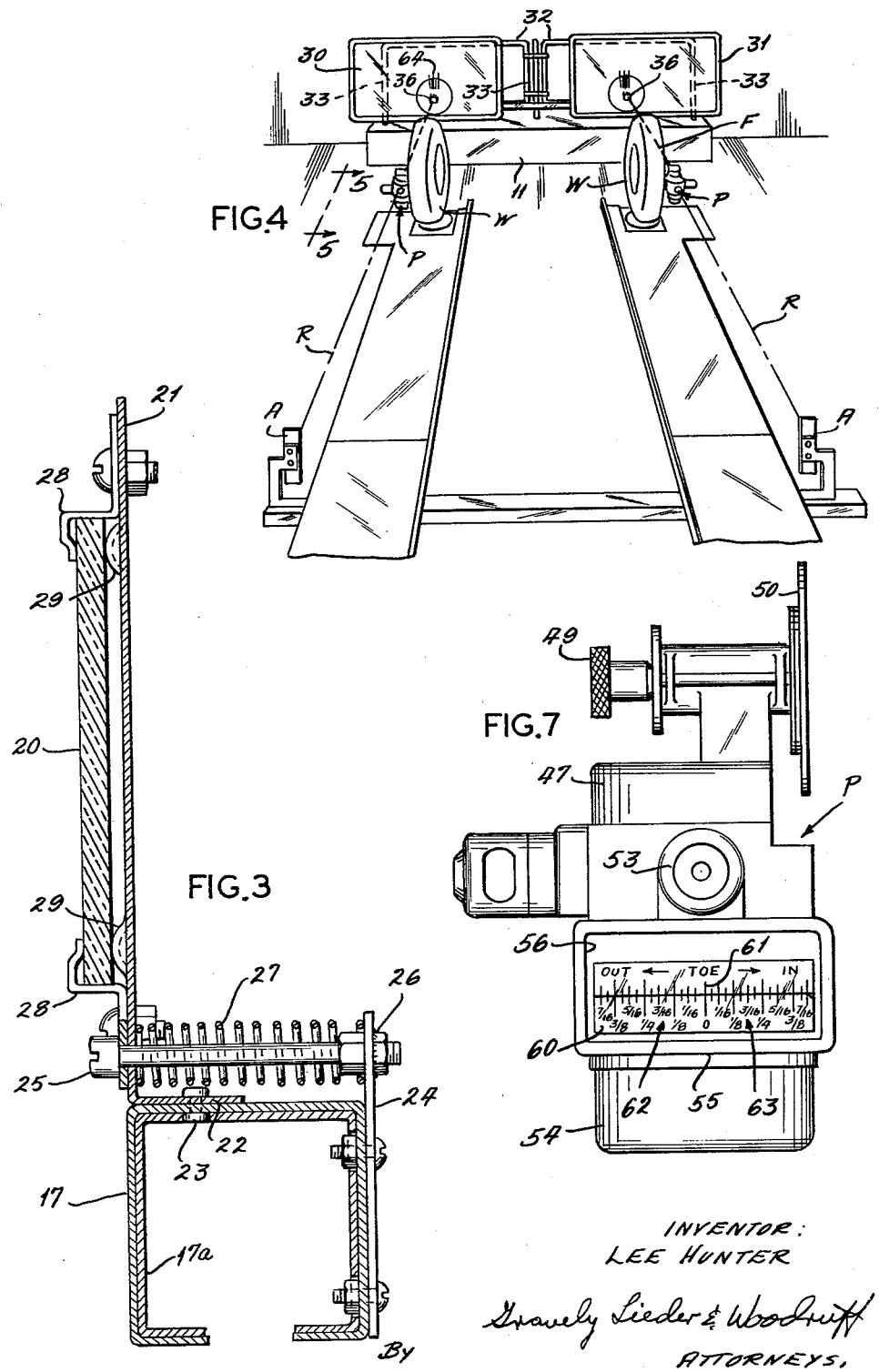

INVENTOR
LEE HUNTER
Gravely, Lieder & Woodruff
BY ATTORNEYS

United States Patent Office 3,159,916
Patented Dec. 8, 1964

3,159,916
VEHICLE WHEEL ALIGNMENT APPARATUS
Lee Hunter, Rte. 1, Box 136, Creve Coeur, Mo.
Filed Jan. 8, 1959, Ser. No. 785,705
9 Claims. (Cl. 33—46)

This invention relates to improvements in apparatus for determining the conditions existing in vehicle wheel alignment and for aiding the adjustment of wheel alignment characteristics to certain predetermined standards.

A principal object of this invention is to provide apparatus of the light beam type which is adapted to project a light beam responsible to the vehicle wheel upon a chart so that the alignment characteristics of the wheel may be rapidly and accurately checked.

It is also an object of the invention to provide vehicle wheel alignment measuring apparatus in which a light beam projector located at the wheel will cause a light beam to describe the wheel motion upon a chart so that inaccuracies may be determined.

A further object of the invention is to provide alignment apparatus for accurately and rapidly determining the toe-in characteristics of vehicle wheels and for following the toe-in motion during adjustment in a simple and novel manner.

Another object of the invention is to provide a novel combination of charts for light beam type alignment apparatus whereby the toe-in and other wheel alignment characteristics may be accurately determined and continuously followed during adjustment.

A still further object of the invention is found in the provision of alignment chart mounting means and means for effecting service adjustments thereof to maintain the charts accurately conditioned.

Another object of the invention resides in alignment apparatus incorporating a novel system of charts and mirrors for checking wheel alignment characteristics and light beam projecting means and scales cooperating with the charts and mirrors.

A preferred embodiment of this invention comprises a system of light beam projectors and scales at the vehicle wheels together with mounting means therefor, and a system of charts and mirrors adapted to cooperate with the projectors to relay the light beams for the purpose of determining wheel alignment characteristics and for use in the making adjustments therein. The invention also comprises means for accurately setting up the apparatus in the first place and for maintaining its accuracy in service. The invention may also comprise sub-assemblies, components, devices and parts of the complete apparatus, some of which are adapted to be mounted on the vehicle and some not so mounted but which cooperate in attaining the stated and other objects.

The apparatus chosen for disclosure herein is illustrated in the accompanying drawings, wherein:

FIG. 1 is a perspective view of the mirror supporting structure and mirror alignment checking device constituting portions of the present apparatus;

FIG. 2 is an enlarged transverse sectional elevation of the mirror supporting structure taken at line 2—2 in FIG. 1, the structure being typical for both mirrors in the apparatus;

FIG. 3 is an enlarged tranverse sectional elevation of the mounting means for each of the mirrors in the apparatus, the view being taken at line 3—3 in FIG. 1;

FIG. 4 is a perspective view of the apparatus similar to the view of FIG. 1, but showing the alignment charts in operating positions in front of the mirrors and including the vehicle wheels in position for alignment, together with the light beam projectors and cooperating components therefor;

FIG. 5 is an elevational view of the left front vehicle wheel showing the light beam projector, the view being taken at line 5—5 in FIG. 4;

FIG. 6 is a front elevational view of the light beam projector attachment to the left front wheel of the vehicle, the view being seen at line 6—6 in FIG. 5;

FIG. 7 is a view similar to FIG. 6, but illustrating the scale provided in the light beam projector attached to the right front wheel of the vehicle;

Figure 8:
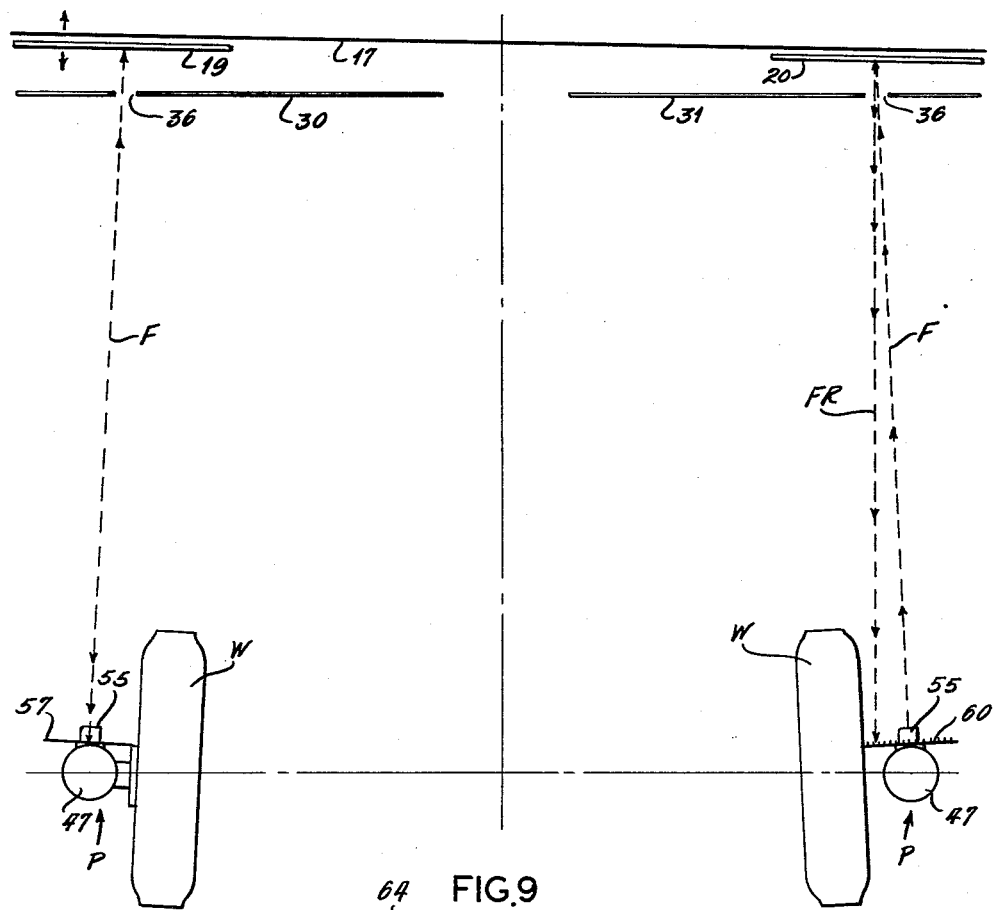
FIG. 8 is a schematic plan view of the apparatus shown in FIG. 4 to illustrate the method of operation thereof for alignment of the front wheel toe-in characteristics of a vehicle.

The apparatus is best seen with respect to its general construction and layout in FIGS. 1 to 4 wherein a suitable level floor area is chosen for its installation. The layout may be made in connection also with an elevated rack structure for the vehicle which is quite common, or it may be in a pit type installation. In whatever layout is chosen the apparatus will incorporate suitable vehicle wheel supporting turn plates 10 located in spaced relation with a base support 11. The base 11 carries a pair of similar support standards or brackets 12 having a rocking bearing or knee 13 and an adjusting leg 14 positioned in a guide channel 15. The guides 15 are sufficiently wide to permit sliding the legs 14 sidewise or in the lengthwise direction of base 11 for a purpose to be later pointed out. Each leg is 14 is provided with a tilt adjusting screw 16 by means of which the vertical legs 14' of the brackets 12 may be caused to rock forward or backward on the knee 13 when adjusting the same to raise or lower the upper end 18 thereof. An elongated box-section bar of suitably formed and interconnected sections 17 is secured to the upper legs 18 of the respective brackets 12 to support the necessary mirrors and the like which are parts of the apparatus. The bar sections 17 in assembly are telescoped over a connecting bar 17a which acts as a splice to fasten the bars to.

As shown in FIG. 1, and in detail in FIGS. 2 and 3, a mirror 19 is carried on the section 17 of the supporting bar and a second mirror 20 is carried on the cooperating section 17 of this bar. The sections 17 of this bar are slipped over splice bar 17a as shown in FIG. 3. A description of the mounting of one such mirror will be given with the understanding that the other mirror is similarly mounted and like reference numerals will apply to each. A mirror bracket 21 (FIG. 3) is formed with a lower flange 22 secured near one end to the bar 17 by a pivot element 23 which is also the means to connect the flange 22 to the bar. Thus, the flange 22 is free to swing about the element 23 as a center and is adjustably connected near the opposite end to a fixed element 24 through the adjusting screw 25. Screw 25 turns in the bracket 21 and extends through a fixed nut 26 in the element 24, and a suitable spring 27 over the screw abuts with the rear surface of bracket 21 and with the fixed element 24 so as to urge bracket 21 against the head of the screw 25. In or out adjustment of screw 25 will compress the spring 27 or permit its expansion to cause movement of the bracket 21 about the pivot element 23 near its opposite ends, whereby the mirror 19 on the bracket 21 may be accurately adjusted in a horizontal direction so that the mirrors 19 and 20 can be suitably aligned to be parallel (see FIG. 8). However, one of the adjusting screws 25, say the one associated with mirror 19, may be eliminated and a connecting element 23 substituted so that only mirror 20 need be adjustable. Vertical adjustment of each mirror 19 and 20 relatively to or independently of the other is accomplished at the respective legs 14 by means of screws 16 previously described. The bar 17 is made to possess flexibility in torque without impairing its rigidity in bending so that independent or selective adjustment of either screw 16 will introduce sufficient torque reaction to rock the adjacent mirror bracket 21 without affecting the remote mirror bracket.

Mirror 19 is attached (FIG. 3) to its bracket 21 at spaced points by suitable angle clips 28 which clasp the front face of the mirror and hold the same against a dimple or projection 29 formed in the bracket 21. The mirror 20 is similarly attached, and in each instance the clips 28 hold the mirrors without causing distortion thereof such as might stress the mirror face out of a desired true flat plane. It is obvious that each mirror 19 or 20 may be adjusted relative to its bracket 21 by loosening the clips 28 to allow lateral sliding thereof.

Figure 9:
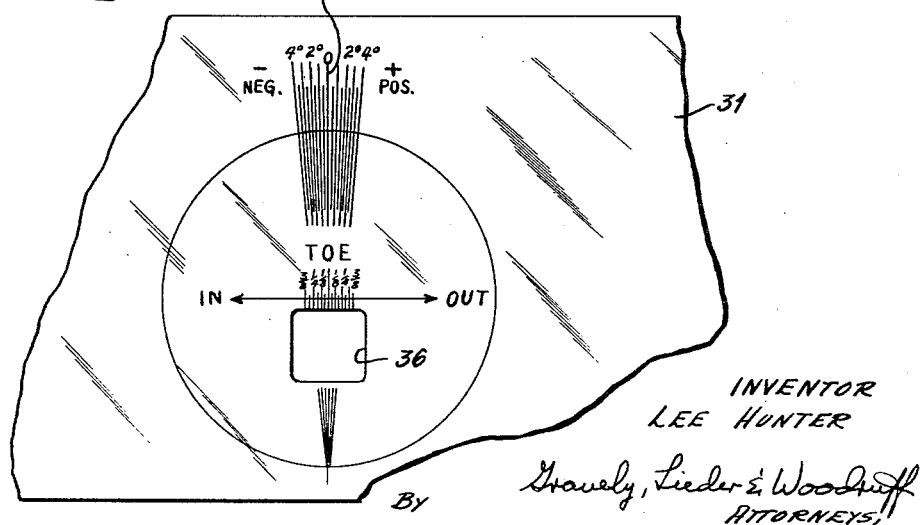
FIG. 9 is a greatly enlarged and fragmentary view of a portion of one chart to show the wheel toe scale which is typical of the showing in FIG. 4.

In FIG. 4 the apparatus is seen to include a pair of chart screens 30 and 31 suitably adjustably suspended from horizontal track means 32, the track being attached to the housing 11 by standards 33. The screens 30 and 31 are positioned in front of the respective mirrors 19 and 20 when in use, but may be removed for adjustment of the mirrors. Each screen is formed (FIG. 9) with an aperture 36 in front of the mirrors so that a light beam can pass through and be reflected back to the beam-projector, as will be later described in connection with the operation of the apparatus for wheel toe-in checking.

Again referring to FIG. 1, the apparatus includes a mirror alignment checking device in the form of an elongated peep hole bar 37. The bar 37 is supported on similar standards 38 at an elevation substantially equal to the elevation of mirrors 19 and 20. Standards 38 have suitable feet 39 to fit upon the wheel turning plates 10. The bar 37 is provided with a series of peep holes 40, 41 and 42 at the left side and a similar series 43, 44 and 45 at the right side. Each peep hole is provided at the back face with cross marks which intersect in the hole center. The left mirror 19 is also provided with three cross marks 40a, 41a and 42a corresponding in spacing with peep holes 40, 41 and 42 in the bar 37, and the right mirror 20 also has cross marks 43a, 44a and 45a matching the spacing of peep holes 43, 44 and 45 in bar 37. Bar 37 is used in the following manner to check the mirrors 19 and 20 to bring them into absolutely parallel relation with each other in a plane longitudinal with the support bar 17.

Bar 37 is first placed adjacent the mirrors 19 and 20 with peep hole 40 directly on top of cross 40a on mirror 19. If mirror 20 is properly located and attached to its bar section 17 the cross 43a will be directly opposite peep hole 43. The other peep holes will automatically line up to exact center spacing thereof in manufacture. If the cross 40a or 43a is not lined up properly, the associated mirror 19 or 20 may be adjusted by loosening clips 28 and sliding the mirror to the desired position. Bar 37 is next placed on the turn plates 10 which are approximately seventy (70) inches from the mirrors 19 and 20, and the distance is measured to be sure bar 37 is exactly parallel with bar 17. A sight is made through peep hole 40 and the mirror 19 will reflect the back face of bar 37 and the cross marks at hole 40. The bar 37 is next moved sideways as needed to exactly line up the cross marks at the back of peep hole 40 with cross marks 40a. Exact alignment in the vertical direction may require turning screw 16 in the bracket leg 14 to rock the bracket 12 for adjusting the mirror 19. A sight is next made at peep hole 43 upon cross mark 43a on mirror 20 to exactly match the cross marks on the back face thereof. Adjustment of the screw 25 in support 21 for mirror 20 may be needed to move mirror 20 horizontally back or forward to secure exact alignment of the cross marks for peep hole 43 and cross mark 43a, and it may also be necessary to adjust screw 16 in arm 14 to vertically adjust the mirror 20 to secure such alignment. Since the bars 17 and 37 are now parallel and the peep holes 40 and 43 are located directly opposite to the cross marks 40a and 43a on mirrors 19 and 20, it is determined that the two mirrors are absolutely parallel with one another at the cross marks thus sighted. To determine if the mirrors are flat and, therefore, in parralel, longitudinal planes along the length of each mirror, sights are made successively through the other peep holes 41, 42, 44 and 45 to see if the corresponding cross marks 41a, 42a, 44a and 45a line up exactly with the corresponding cross marks at the back side of the bar 37 which may be seen reflected in the mirrors. Assuming that all cross marks do correctly line up, it is certain that the mirrors are flat to the degree desired. The bar 37 may now be removed and a vehicle placed with the front wheels W upon the turn plates 10, as in FIGS. 4 and 8. It is understood, of course, that the vehicle need not be illustrated in order to simplify the drawing.

The vehicle wheels W are set in a straight ahead position on plates 10, and a light beam projector P of the type shown in FIGS. 5, 6 and 7 is attached to the outer rim of each by means of the mounting bracket device B which will not be described in detail since it forms no part, per se, of this invention.

Turning to FIGS. 5, 6 and 7, each projector P includes a housing 47 having a bearing head 48 to receive a shaft 49 fixed to the mounting plate 50 on the bracket B. The housing 47 is free to swing about shaft 49 and always assume a pendent position as the wheel W is rotated. A light source (not shown) is contained in housing 47 supplied by an electric cord 51 from a suitable electrical outlet. The light beams in the form of horizontal and vertical coordinate cross lines are projected from the housing 47 by means of suitable lens units 52 and 53, lens unit 52 projecting beam F and lens unit 53 projecting beam R. A suitable cooling fan is contained in the base 54 of the projector to circulate air and carry the heat therefrom, as is common. A box-like light beam receiving device 55 is secured to the housing 47 adjacent lens unit 52 and the box opening 56 faces the screens 30 and 31. The projector P shown in FIGS. 5 and 6 is attached to the left-hand wheel W in FIG. 4, and a similar projector P is attached to the right-hand wheel W in FIG. 4. Each projector is the same except for the scale contained in the box 55. The left-hand projector P (FIG. 6) has a simple zero index scale 57 in the device 55 arranged with a horizontal coordinate line 58 and a vertical coordinate cross line 59. On the other hand, the right-hand projector P has a toe scale 60 (FIG. 7) in the device 55, such scale being suitably scribed with a vertical coordinate zero line 61 and toe-out and toe-in horizontal coordinate line having portions for measurement scales 62 and 63, respectively, on which fractional indica are indicated.

The projectors P are turned on to throw light beams F forward at screens 30 and 31, and light beams R rearward along side the vehicle. The straight ahead position of wheels W is determined with the projectors P lighted by turning the wheels upon the turn plates 10 until the beams R intersect suitable marks on targets A. The targets A are positioned approximately seventy (70) inches back of the projectors P and are equal distances out from the longitudinal center line of the vehicle frame (not shown). Any convenient scale or measuring stick (not shown) may be used to locate targets A outward from the frame so that the light beams R show up on the stick to indicate when equal distances are obtained. It may be necessary to slightly turn the wheels W to achieve the desired result.

In FIG. 8 there is illustrated schematically a plan view of the apparatus in use for determining toe-in or toe-out characteristics of wheels W. The method of operation, once the wheels have been set in a straight ahead attitude as above described in connection with FIG. 4, requires the mechanic to slide the left-hand end of mirror supporting bar 17 forward or backward (toward or away from the vehicle) by moving leg 14 in the guide 15 in order to adjust the left mirror 19 to reflect the vertical line of beam F directly back upon the vertical zero index line 59 on scale 57 in the device 55. Next the adjusting screw 16 for the left mirror 19 is turned until the horizontal line of the same beam F lies upon the horizontal scale line 58. The forward or backward sliding of the bar 17 also adjusts right mirror 20 by an amount which will cause the forward light beam F to be reflected back along the beam line FR which deviates from the beam F by a small angle. The reflected light beam FR from mirror 20 strikes the toe scale 60. It may be necessary to adjust the screw 16 of the right-hand leg 14 to get the horizontal light beam line to fall upon the horizontal line of the toe scale indica. The vertical beam line of the beam FR will now fall upon the toe-in scale portion 63 or toe-out scale portion 62, depending upon the actual conditions. The amount of toe may be read directly on the chart 60 since the left wheel beam F has been set to its zero setting on chart 57.

The apparatus described is very useful when making necessary adjustments on the vehicle tie-rods to overcome incorrect toe of the wheels. It is necessary for the mechanic to be under the vehicle when adjusting the tie-rods, so the direct reading toe scale 60 at the right-hand projector P cannot be observed. This situation is overcome by adjusting the chart screens 30 and 31. The screen 30 is moved on the support track 32 until the vertical zero line 64 on the toe chart adjacent aperture 36 registers with the vertical line of the left-hand light beam F. Screen 31 is also moved on track 32 to bring the vertical light line of the right-hand light beam F into register with the same fractional reading line (toe-in or toe-out) on the toe chart carried by the screen 31 as was obtained directly upon the right-hand projector scale 60. The mechanic may now make the tie-rod adjustments and can note the results thereof by observing the light line projected upon the right-hand screen 31 while remaining under the vehicle.

The preferred form of the invention described herein is capable of change and variation in its several parts without altering the principle of its operation or the method of application as set forth herein and defined by the annexed claims. For example, the scale or chart in the left-hand receiver device 55 may be similar to the scale or chart 60 in the right-hand receiver device 55 so that the wheel toe characteristics may be obtained at either wheel. In the latter case it may be useful, if the toe characteristics are badly off the desired standard, to adjust each wheel W in order to preserve the center steering goemetry. It is also a feature of the described apparatus to be able to follow the wheel adjustments visually from beneath the vehicle by following the steps in the method of setting the apparatus into use with the aid of the charts 30 and 31. It is, of course, understood that the light beams projected by the projectors P may have crossed filaments which are aligned to assume vertical and horizontal positions, and the filaments may be elongated to extend over width and height distances greater than those of chart openings 36.

What is claimed is:

1. In wheel alignment apparatus the improvement comprising a set of mirrors, a mirror supporting means, devices connecting each mirror of said set to said supporting means for adjustment of the mirrors in the set relative to each other, one of said devices including a pivot connecting element and an adjusting element spaced from said pivot connecting element, said adjusting element being operable to move said device about said pivot connecting element for moving said associated mirror, a set of adjustable standards connected to said supporting means in spaced relation, a rocking bearing in each standard, and independent means operable to adjust each of said standards about its said rocking bearing.

2. In wheel alignment apparatus the improvement comprising a set of mirrors, horizontally elongated supporting means, devices connecting each mirror of said set to said supporting means for adjusting the mirrors in the set relative to each other, one of said devices including a pivot connecting element and an adjusting element aranged in spaced relation and operable to adjust the associated mirror in a horizontal plane relative to said supporting means and about said pivot connecting element, and a set of adjustable vertical standards connected to said support means to support the same horizontally, each standard including a rocking bearing and means operable to rock said standard about said rocking bearing and cause angular displacement of said supporting means.

3. In wheel alignment apparatus the improvement comprising a set of mirrors, horizontally elongated supporting means, devices connecting said set of mirrors to said supporting means in spaced relation, one of said devices including a pivot connecting element and an adjusting element operable to adjust the associated mirror relative to said supporting means and about said pivot element, a set of adjustable vertical standards connected to said supporting means to support the same horizontally, each standard including a rocking bearing and means operable to rock said standard about said rocking bearing and cause angular displacement of said supporting means, and means adjustably retaining said mirrors on said devices, said last means permitting movement of a mirror relative to others of said set to alter the horizontal spacing of said set of mirrors.

4. In wheel alignment apparatus the improvement comprising a pair of mirrors, a mirror supporting bar, bracket means connected to said bar to support the same in a horizontal position, devices connecting said mirrors to said bar to support the same in vertical positions and substantially in the same longitudinal plane, means in one of said devices for adjusting the associated mirror to obtain adjustments of said latter mirror relative to said bar, a base to support said bracket means, screens in front of said mirrors, and a screen supporting structure on said base permitting relative movement between said screens and mirrors, said screens having apertures therein to expose the said mirrors and wheel alignment indicia inscribed thereon adjacent said apertures.

5. In wheel alignment apparatus for finding an alignment characteristic of vehicle wheels in which light beams are directed by mirrors, the improvement comprising a pair of spaced substantially flat mirrors, means independent of support from the vehicle for supporting said pair of mirrors in substantially parallel longitudinal planes lengthwise of the mirrors, said supporting means including a device to adjust one of said mirrors independently of the other in a horizontal plane and a device to rock said support means for adjusting said mirrors in a vertical plane, each mirror having a plurality of cross line indicia thereon in spaced relation lengthwise of the mirrors, and a mirror flatness testing device associated with said mirrors including a test bar having spaced groups of peep holes therein corresponding as to spacing in each group with the spacing of the cross line indicia on the opposite one of said mirrors, said testing device having cross line indicia for each peep hole and means supporting said test bar spaced a predetermined distance from said pair of mirrors with the peep holes of each group sighted to be opposite the cross line indicia of the associated mirror and said mirrors reflecting the images of said peep hole cross line indicia, said mirror adjusting devices being manipulated to move each of said mirrors to reflectively superimpose the several cross line indicia, whereby the cross line indicia of each peep hole exactly lines up with the corresponding mirror cross line indicia.

6. In a light beam reflecting device for use in wheel alignment apparatus, a base, spaced standards mounted on said base, each standard having angularly related legs, a longitudinal support bar attached to corresponding ones of the legs of each standard, said bar being substantially rigid in bending and being yieldable in torque about its longitudinal axis, light beam reflective means carried in spaced relation on said bar, and adjustment means carried by the other corresponding legs of said standards to independently move said standards and impose a torque reaction in said bar to relatively angularly adjust said reflective means.

7. The device set forth in claim 6, wherein said angularly related legs of each standard are substantially in horizontal and vertical positions, and said support bar is connected to the vertical ones of said legs, whereby relative adjustment of said adjustment means causes said bar to move back and forth in a substantially horizontal direction under torque reaction.

8. The device set forth in claim 7, wherein each of said standards has a rocking bearing adjacent the junction of said angularly related legs thereof, and said adjusting means is spaced from said rocking bearing.

9. Apparatus to locate flat reflective surfaces, in the same plane and to determine the flatness thereof comprising spaced reflective surfaces, each having indicia thereon in spaced relation, a supporting assembly for said reflective surfaces including a movable frame for each surface and means to adjustably attach said surface to its frame, and a sighting member provided with groups of spaced sighting apertures equal in number to said reflective surfaces and each group having sighting apertures in spaced relation substantially equal to said spaced indicia on each reflective surface, said sighting apertures and indicia being cooperative in configuration to have matching characteristics and adjustment of said reflective surfaces bringing together the matching characteristics of said sighting apertures and indicia on said reflective surfaces.

References Cited in the file of this patent
UNITED STATES PATENTS

| | | |
|---|---|---|
| 1,106,503 | Fitchet | Aug. 11, 1914 |
| 2,161,886 | Weaver | June 13, 1939 |
| 2,213,605 | Mathieu | Sept. 3, 1940 |
| 2,249,226 | Peters | July 15, 1941 |
| 2,292,969 | Peters | Aug. 11, 1942 |
| 2,380,501 | Christian et al. | July 31, 1945 |
| 2,489,506 | Seutin | Nov. 29, 1949 |
| 2,601,262 | Carrigan | June 24, 1952 |
| 2,755,554 | MacMillan | July 24, 1956 |
| 2,795,859 | Buschbach | June 18, 1957 |

FOREIGN PATENTS

| | | |
|---|---|---|
| 551,283 | Italy | Nov. 17, 1956 |
| 814,652 | Great Britain | July 1, 1959 |